United States Patent
Winter et al.

(10) Patent No.: US 6,882,304 B2
(45) Date of Patent: Apr. 19, 2005

(54) DEVICE FOR A RADAR SYSTEM

(75) Inventors: Klaus Winter, Schwieberdingen (DE); Hermann Mayer, Vaihingen (DE); Bernhard Lucas, Besigheim (DE); Thomas Beez, Weinsberg (DE); Juergen Hildebrandt, Weilheim (DE); Joachim Hauk, Renningen-Malmsheim (DE); Herbert Olbrich, Rutesheim (DE); Andreas Kugler, Alfdorf (DE); Wolfgang Ehrlinger, Aspach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/318,873

(22) Filed: Dec. 13, 2002

(65) Prior Publication Data

US 2004/0061638 A1 Apr. 1, 2004

(30) Foreign Application Priority Data

Dec. 21, 2001 (DE) ......................... 101 63 653

(51) Int. Cl.[7] ................. G01S 13/536; G01S 13/00; G01S 13/93
(52) U.S. Cl. .................... 342/128; 342/27; 342/28; 342/70; 342/104; 342/113; 342/118; 342/175; 342/195
(58) Field of Search ................. 701/300, 301; 342/104–117, 27, 28, 59, 70–81, 89–103, 118, 128–133, 175, 192–197

(56) References Cited

U.S. PATENT DOCUMENTS

| | | | | |
|---|---|---|---|---|
| 5,181,037 A | * | 1/1993 | Komatsu | 342/70 |
| 5,229,774 A | * | 7/1993 | Komatsu | 342/70 |
| 5,369,409 A | * | 11/1994 | Urabe et al. | 342/133 |
| 5,448,244 A | * | 9/1995 | Komatsu et al. | 342/70 |
| 5,579,010 A | * | 11/1996 | Iihoshi et al. | 342/70 |
| 5,583,511 A | * | 12/1996 | Hulderman | 342/175 |
| 5,614,909 A | * | 3/1997 | Komatsu et al. | 342/70 |
| 5,652,589 A | * | 7/1997 | Ono et al. | 342/70 |
| 5,657,024 A | * | 8/1997 | Shingyoji et al. | 342/175 |
| 5,717,399 A | * | 2/1998 | Urabe et al. | 342/70 |
| 5,724,042 A | * | 3/1998 | Komatsu et al. | 342/175 |
| RE36,095 E | * | 2/1999 | Urabe et al. | 342/133 |
| 5,933,109 A | * | 8/1999 | Tohya et al. | 342/175 |
| 5,940,029 A | * | 8/1999 | Ninomiya et al. | 342/81 |
| 5,945,939 A | * | 8/1999 | Iihoshi | 342/70 |
| 6,031,483 A | * | 2/2000 | Urabe et al. | 342/70 |

FOREIGN PATENT DOCUMENTS

| | | | | |
|---|---|---|---|---|
| DE | 19501612 A1 | * | 7/1996 | ........... G01C/03/06 |
| EP | 0733913 | | 9/1996 | |
| EP | 0 952 459 A2 | | 10/1999 | |
| EP | 0 766 100 A1 | | 3/2001 | |
| GB | 2283631 A | * | 5/1995 | ........... G01S/13/06 |
| WO | WO 97/02496 | | 1/1997 | |

* cited by examiner

Primary Examiner—Bernarr E. Gregory
(74) Attorney, Agent, or Firm—Kenyon & Kenyon

(57) ABSTRACT

A device for a radar system, the device being supplied with the received signals of at least two receiving antennas as input signals, and in which the output signals of this device are supplied to at least one unit for evaluating the received signals which includes at least two evaluation channels. Different input channels are allocated to the at least two evaluation channels as a function of supplied control signals.

7 Claims, 4 Drawing Sheets

DEVICE FOR A RADAR SYSTEM

FIELD OF THE INVENTION

The present invention relates to a device for a radar system, the device being supplied with the received signals of at least two receiving antennas as input signals, and in which the output signals of this device are supplied to at least one unit for evaluating the received signals which includes at least two evaluation channels. Different input channels are allocated to the at least two evaluation channels as a function of supplied control signals.

BACKGROUND INFORMATION

International Patent Publication No. WO 97/02496 describes a monostatic FMCW (frequency modulated continuous wave) radar sensor for a vehicle for detecting objects, in which at least one antenna feed, in conjunction with a dielectric lens, is provided both for transmitting and for receiving a corresponding echo signal. At least one antenna feed is connected via a rat-race ring or a double rat-race ring to a ring mixer, so that it is possible to dispense with a costly circulator. This device provides for a three-channel transmitting and receiving concept, in which a separate evaluation unit is provided for each of the three channels for evaluating the received signals. In this device, an evaluation channel is permanently allocated to each receiving antenna.

European Patent No. 0733913 describes a radar module having a plurality of antennas, transmitting devices and receiving devices. The received signals are supplied via a selector to an analog-to-digital converter, the selector switching through one channel alternating in turn.

SUMMARY OF THE INVENTION

The essence of the present invention is to provide a device which makes it possible to supply the output signals of a plurality of receiving antennas to one or more evaluation units; the evaluation unit may also include a plurality of evaluation channels. At the same time, it is provided that the number of evaluation channels is less than or equal to the number of receiving antennas. The device of the present invention makes it possible to allocate a portion of the received signals to the evaluation channels in a flexible and rapidly switchable manner. The necessary number of costly and complicated evaluation units and evaluation channels, respectively, is thereby reduced.

Advantageously, the input signals of the device according to the present invention are demodulated received signals. By providing demodulated received signals, it is not necessary to design the device according to the invention for a high frequency range which lies in the range of the carrier frequency of advantageously 77 GHz.

Moreover, it is advantageous that a plurality of input signals may be supplied to the evaluation channels at the same time. Thus, received signals from several antennas may be evaluated at the same time, only the antenna areas which are of special interest depending on the instantaneous driving situation being evaluated with the aid of the device according to the invention.

It is further advantageous if the number of output channels is less than or equal to the number of input channels.

It is particularly advantageous that four input channels and two or three output channels are provided. The result of providing four input channels is that four transmission and receiving antennas are advantageously provided which can be powered with the aid of simple 3 dB power dividers. Thus, from each of the four input antennas, one input channel is conducted to the device of the present invention in which, optionally, two or three output channels are routed to the evaluation unit; the number of antenna areas to be evaluated as well as their selection may be made a function of the instantaneous driving situation, thus the relative location and the number of radar objects detected.

Moreover, it is advantageous that this device of the present invention is used in a radar sensor for adaptive distance and speed control (adaptive cruise control), particularly in a motor vehicle.

In addition, it is advantageous if the allocation of input channels to output channels is determined at least as a function of the number and the relative position of the objects detected by the radar system. Therefore, it is possible that a radar reception area which is covered only by one or two receiving antennas is passed through by the device of the present invention for evaluation, whereas another radar detection area, which is covered by another antenna but in which no radar objects were detected at the moment, is not passed on for evaluation. It is thereby possible to evaluate precisely the receiving-antenna areas which are of special interest depending on the instantaneous driving situation.

DETAILED DESCRIPTION

Figure 1:
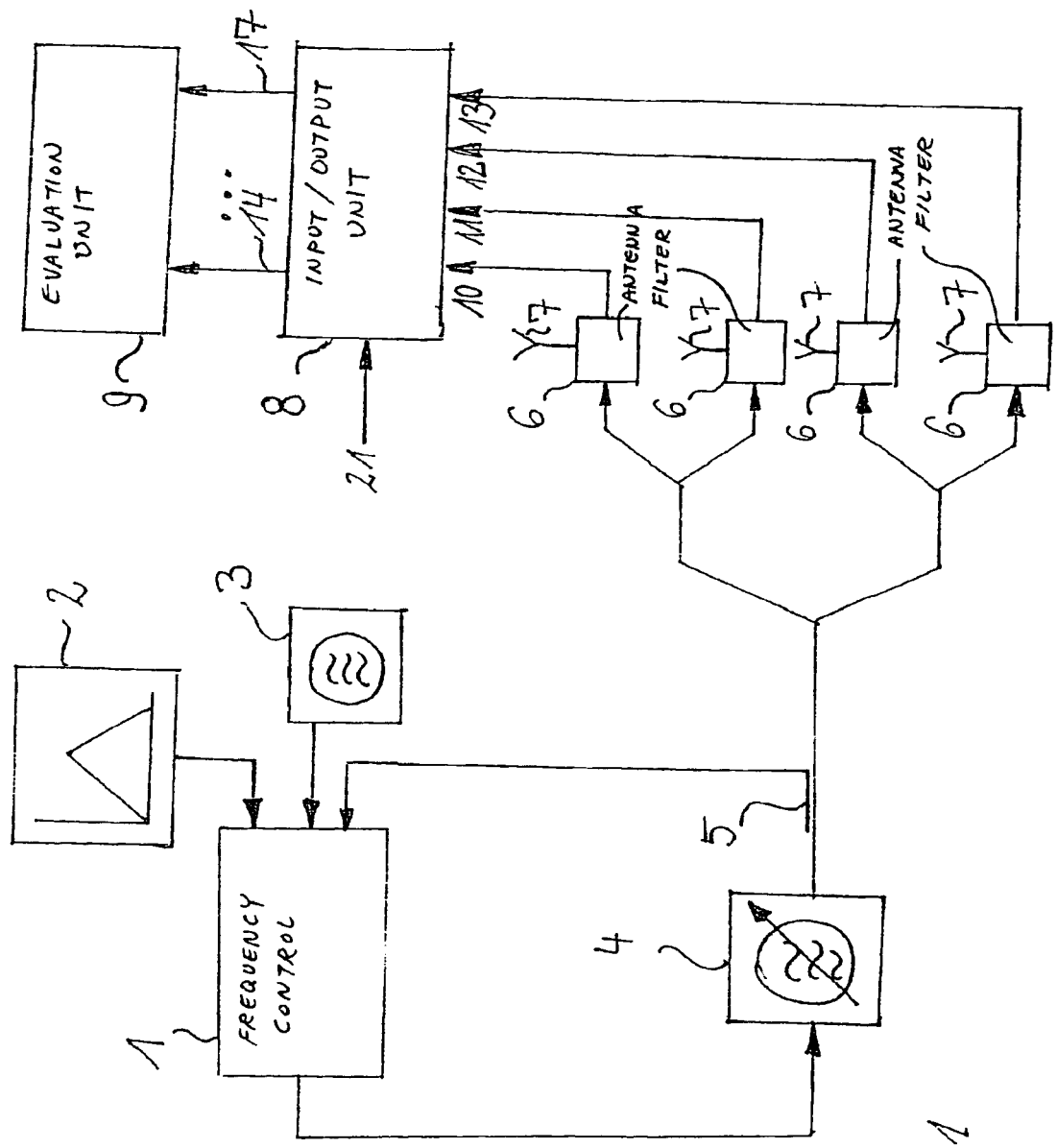
FIG. 1 shows a block diagram of the radar system in which the device of the present invention is used.

FIG. 1 shows a block diagram of a radar system in which the device of the present invention may be used by way of example. A first circuit block 1 can be seen in which the frequency of a radar oscillator is controlled. As input signals, this frequency control in block 1 receives, first of all, a ramp signal, with which the radar signal is to be modulated, that is generated by a ramp generator 2. Frequency control 1 also receives the output signal of a reference oscillator 3 as an input signal. This reference oscillator 3 oscillates generally with a definitively set frequency. As a further input signal of frequency control 1, a portion of the oscillator output signal is supplied which is tapped off from the output signal of Gunn oscillator 4 by a power divider 5 and is fed to frequency control 1. As a function of the input signals described, frequency control 1 generates an output signal which is supplied to Gunn oscillator 4. This Gunn oscillator 4 generates a radar signal which is advantageously formed as a frequency-modulated continuous-wave signal, or as an FMCW signal for short. This output signal of Gunn oscillator 4 to be transmitted is in turn fed with the aid of power divider 5 to frequency control 1, to thus generate an exact radar signal via a feedback control circuit. The greater part of the output signal of Gunn oscillator 4 is fed via power dividers to transmitting antennas 7. Advantageously suited for this purpose is the use of four transmitting antennas, which via three power dividers, that are advantageously implemented as 3 dB power dividers, distribute the transmission power over the individual transmitting antennas.

These transmission signals are supplied to transmitting and receiving antennas 7 via antenna filters 6 which are able to separate the transmitted and received signals from one another. Thus, antenna filter 6 causes the transmission signal, which is output by Gunn oscillator 4, to be supplied to transmitting and receiving antenna 7, however, not to be output at the third output which leads to the evaluation unit. The radar signal sent out by transmitting and receiving antennas 7 is reflected at possibly existing objects and scattered back to transmitting and receiving antennas 7. These transmitting and receiving antennas 7 receive the scattered back radar signals and pass them on in the direction of the evaluation unit with the aid of antenna filters 6. Antenna filter 6 is advantageously made of a rat-race ring, a circulator, a mixer, a double rat-race ring in which two individual rat-race rings are interconnected, or a combination thereof. Antenna filter 6 advantageously includes a mixer which mixes the received signal with the transmission signal and generates a demodulated received signal which is output in the direction of evaluation unit 9 for further processing.

The output signals of antenna filters 6 are supplied as input signals 10, 11, 12, 13 to device 8 of the present invention. In device 8 according to the invention, whose internal design is clarified more precisely in FIG. 2, input signals 10, 11, 12, 13 are allocated to output channels 14 through 17, the number of output channels 14 through 17 being equal to or less than the number of input signals 10, 11, 12, 13. Output signals 14 through 17 are fed to at least one evaluation unit 9 Which includes at least two evaluation channels. It is also conceivable to relay output channels 14 through 17 to two independent evaluation units 9, each of which includes only one evaluation channel. In the at least one evaluation unit 9, the demodulated received signals are subjected, for example, to a Fourier transformation, a spectral analysis is performed or further evaluation steps are carried out.

The allocation of input signals 10, 11, 12, 13 to output channels 14 through 17, which is carried out in device 8 of the present invention, takes place as a function of supplied control signals 21. Supplied control signals 21 may advantageously be supplied from evaluation unit 9 and represent the information as to which of input signals 10, 11, 12, 13 are to be output to output channels 14 through 17.

Figure 2:
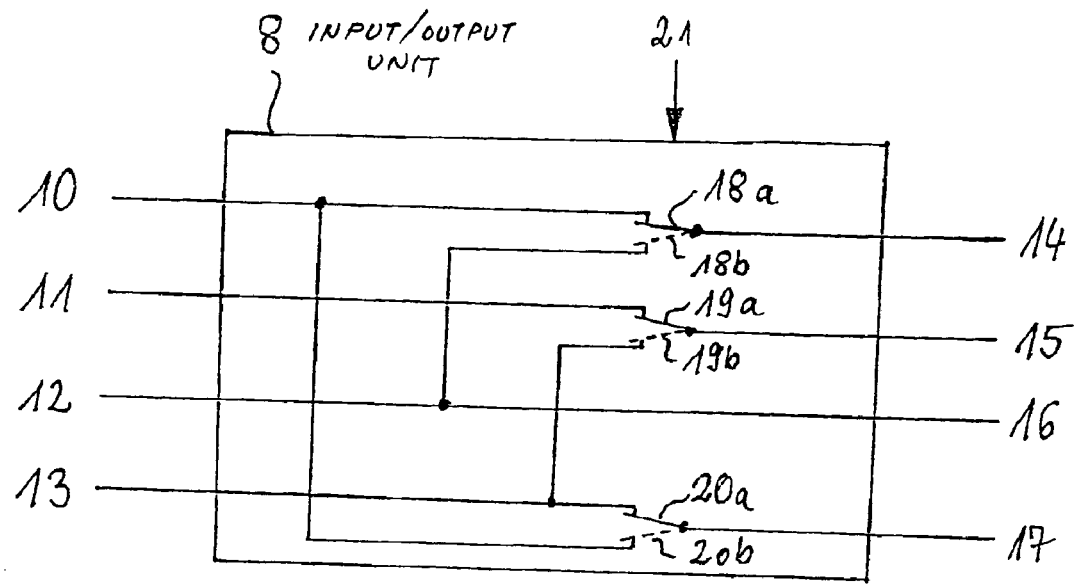
FIG. 2 shows a circuit diagram of the internal design of the device according to the invention.

FIG. 2 shows a functional circuit diagram of device 8 according to the present invention. Input signals 10, 11, 12, 13 can be seen which are fed to device 8. These input signals are output to output channels 14, 15, 16, 17 as a function of the positions of switches 18, 19, 20.

Figure 3:
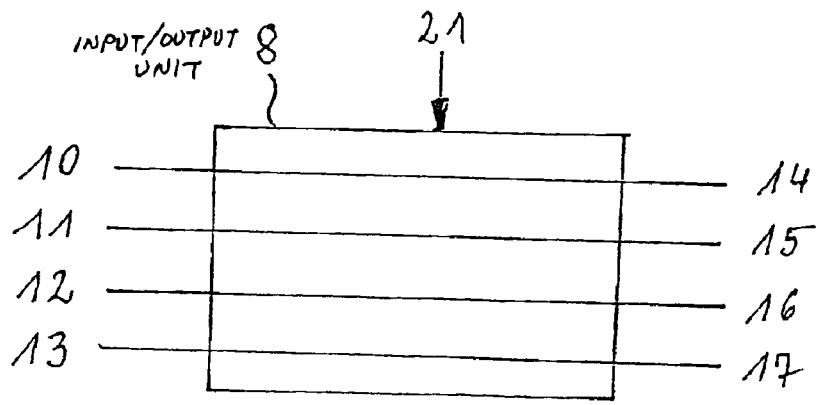
FIG. 3 shows an equivalent circuit diagram of the device according to the invention in a first operating mode.

If with the aid of control signals 21, which are supplied to device 8, it is established that switches 18, 19, 20 are to be operated at the moment in switch positions a, the result is that input 10 is to be output to output 14, input 11 is to be output to output 15, input 12 is to be output to output 16, and input 13 is to be output to output 17. In this operational case, an equivalent circuit diagram for device 8 results according to FIG. 3. In this case, altogether four evaluation channels are provided, so that all four inputs are processed by evaluation unit 9.

Figure 4:
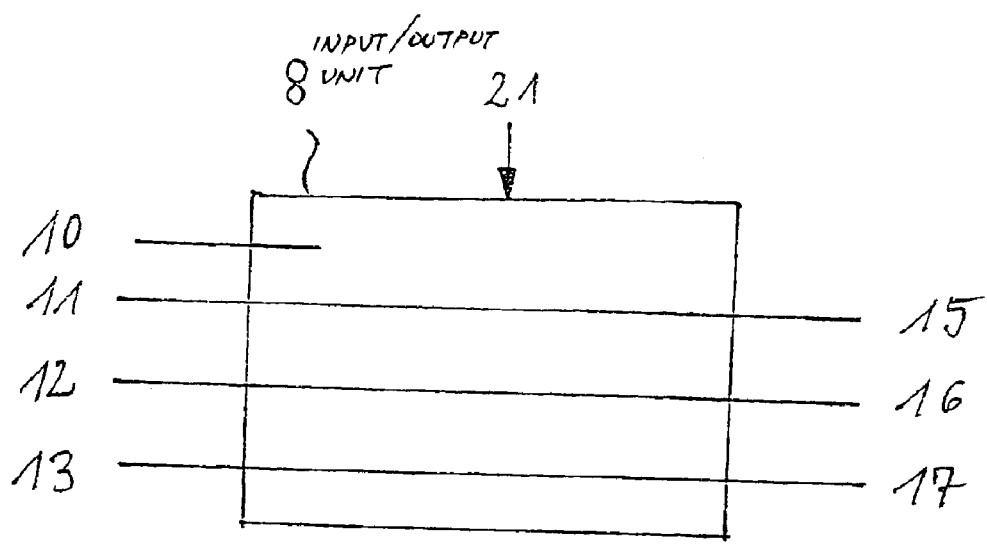
FIG. 4 shows an equivalent circuit diagram of the device according to the invention in a second operating mode.
Figure 5:
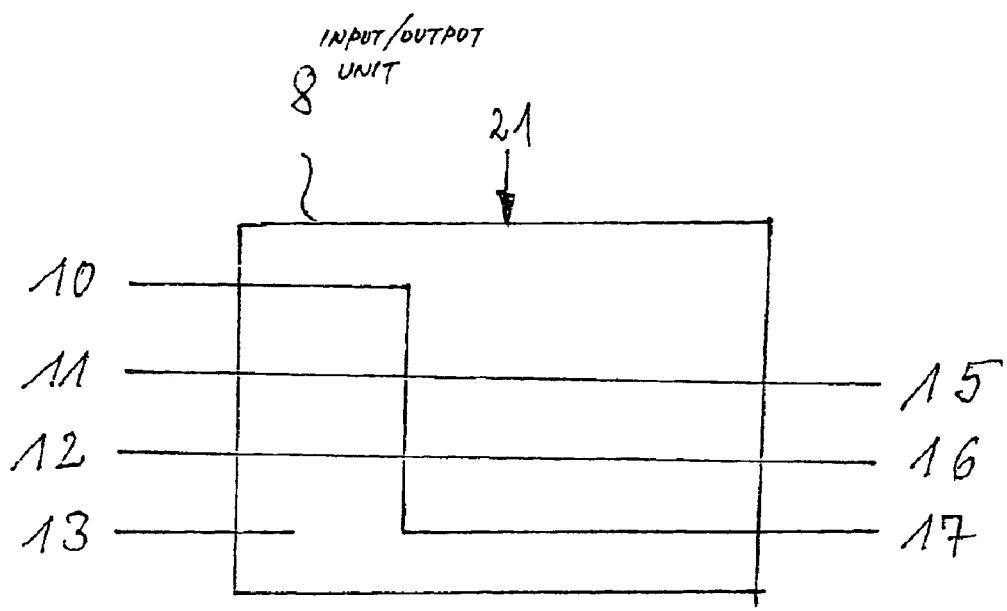
FIG. 5 shows an equivalent circuit diagram of the device according to the invention in a third operating mode.

If provision is made to evaluate only three evaluation channels 15, 16, 17, resulting in a savings of one evaluation channel, then the switch positions are changed accordingly via control-signal input 21. In this case, switch 19 is to be operated in switch position a. Switch position 18 is not relevant in this case, since output channel 14 is not evaluated. Switch 20 is either to be operated in switch position b for the case when input signal 10 is to be output to output channel 17, or switch 20 is to be operated in switch position a for the case when input signal 13 is to be output to evaluation channel 17. In both cases, input signal 12 is output to evaluation channel 16. For these two cases described, in which evaluation channels 15, 16, 17 are evaluated, in the case of switch position 20a, an equivalent circuit diagram for device 8 results according to FIG. 4, and for the case of switch position 20b, an equivalent circuit diagram for device 8 results according to FIG. 5.

Figure 6:
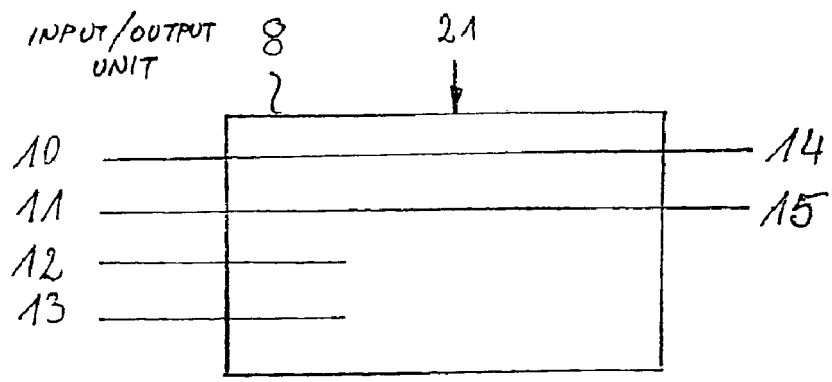
FIG. 6 shows an equivalent circuit diagram of the device according to the invention in a fourth operating mode.
Figure 7:
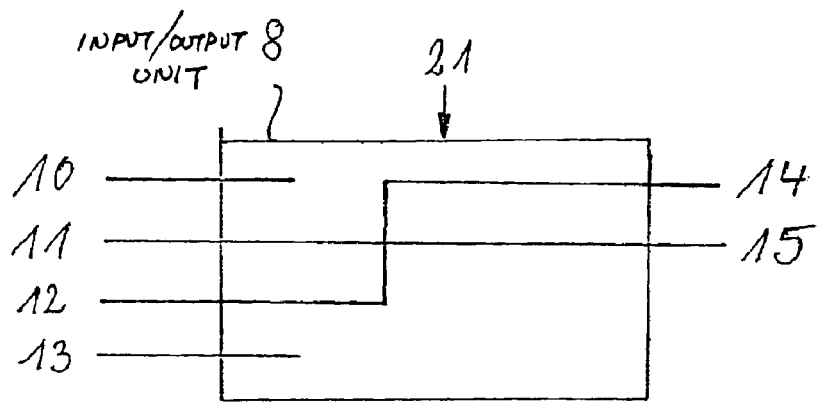
FIG. 7 shows an equivalent circuit diagram of the device according to the invention in a fifth operating mode.
Figure 8:
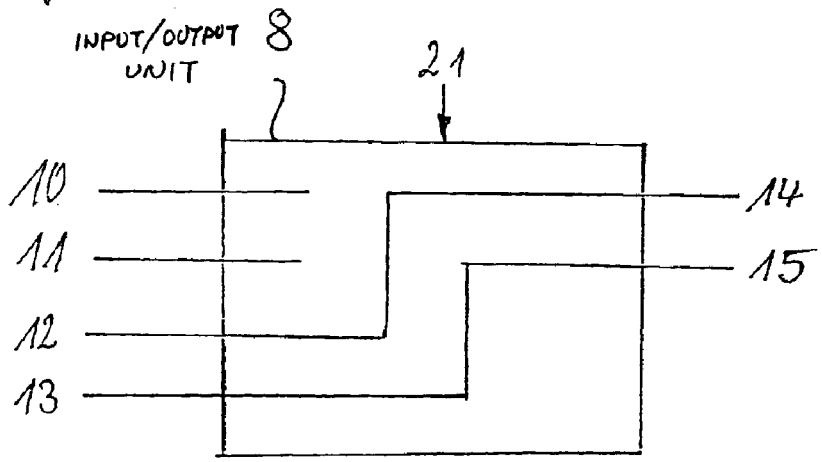
FIG. 8 shows an equivalent circuit diagram of the device according to the invention in a sixth operating mode.

In a further case, only two evaluation channels are available in unit 9. In this case, output channels 14 and 15 are supplied to the evaluation unit; of course, they may also be two other output channels of device 8. In the case when input signals 10 and 11 are to be fed to the evaluation unit, with the aid of control signals 21, switch 18 is operated in position a and switch 19 is likewise operated in position a. The switch position of switch 20 is not of importance in the selection of the two output channels 14 and 15, since output channel 17 is not evaluated. In the case described, in which input signals 10 and 11 are to be output to evaluation channels 14 and 15, on the basis of the switch position described for this operating state, an equivalent circuit diagram of device 8 results according to FIG. 6. If provision is made to feed input signals 11 and 12 to evaluation channels 14 and 15, then with the aid of control signals 21, switch 18 is operated in position b and switch 19 is operated in position a. In this case, a state as shown in FIG. 7 results as equivalent circuit diagram for device 8. If provision is made to feed input signals 12 and 13 to evaluation channels 14 and 15, then with the aid of control signals 21, switch 18 must be operated in position b and switch 19 must likewise be operated in position b. In this case, an equivalent circuit diagram of device 8 according to FIG. 8 results.

By reducing the number of evaluation channels which are supplied to unit 9, the expenditure for signal processing is reduced to a considerable degree. Given the use of three evaluation channels, it is possible to evaluate the two central antenna lobes, which supply their evaluation signals to input signals 11 and 12, as well as one antenna lobe in the edge area, which supplies its evaluation signals to input signal 10 or 13. The locating field of the radar sensor may thereby be adapted to the instantaneous driving situation. For example, in curves it is possible to evaluate the inside locating area (locating area on the inside of the curve) and not to evaluate the uninteresting outside locating area. It is also possible to control the evaluation of the locating edge areas as a function of the lane being used. Given the use of two evaluation channels, it is further possible to determine the lateral position of the detected objects, since two adjacent antenna lobes having an overlapping area are always evaluated.

What is claimed is:

1. A device for a radar system comprising:
   inputs for receiving, over input channels, signals received by at least two receiving antennas;
   outputs for supplying at least two of the signals received by the at least two receiving antennas to at least one evaluation unit, the at least one evaluation unit including at least two evaluation input channels for receiving the at least two signals supplied by the outputs;

an arrangement for assigning different ones of the input channels to the at least two evaluation input channels as a function of at least one control signal applied to the arrangement, wherein assignment of different ones of the input channels of the device to the at least two evaluation input channels varies depending on the control signal.

2. The device according to claim 1, wherein the signals received at the inputs are demodulated received signals.

3. The device according to claim 1, wherein a plurality of input signals are supplied to the evaluation input channels at the same time.

4. The device according to claim 1, wherein a number of evaluation input channels is less than or equal to a number of received signals.

5. The device according to claim 1, wherein a number of input channels is 4 and a number of output channels is one of 2 or 3.

6. The device according to claim 1, wherein the radar system is a radar sensor for adaptive distance and speed control.

7. A device for a radar system, comprising:

inputs for receiving, over input channels, signals received by at least two receiving antennas;

outputs for supplying at least two of the signals received by the at least two receiving antennas to at least one evaluation unit, the at least one evaluation unit including at least two evaluation input channels for receiving the at least two signals supplied by the outputs; and an arrangement for assigning different ones of the input channels to the at least two evaluation input channels as a function of at least one control signal applied to the arrangement;

wherein an allocation of input channels of the device to the outputs of the device is determined at least as a function of a number and positions of objects detected by the radar system.

* * * * *